United States Patent [19]

Paquette

[11] 4,247,605

[45] Jan. 27, 1981

[54] METHOD OF FORMING AND STARTING A SODIUM SULFUR BATTERY

[75] Inventor: David G. Paquette, Costa Mesa, Calif.

[73] Assignee: Ford Motor Company, Dearborn, Mich.

[21] Appl. No.: 137,349

[22] Filed: Apr. 7, 1980

[51] Int. Cl.³ .......................................... H01M 10/44
[52] U.S. Cl. ...................................... 429/52; 429/104; 29/623.2
[58] Field of Search .................... 429/50, 52, 101–104

[56] References Cited

U.S. PATENT DOCUMENTS

| | | | |
|---|---|---|---|
| 4,011,366 | 3/1977 | Bones et al. | 429/61 |
| 4,102,042 | 7/1978 | Weiner | 29/623.2 |

Primary Examiner—Charles F. LeFevour

Attorney, Agent, or Firm—William E. Johnson; Olin B. Johnson

[57] ABSTRACT

A method of forming a sodium sulfur battery and of starting the reactive capability of that battery when heated to a temperature suitable for battery operation is disclosed.

An anodic reaction zone is constructed in a manner that sodium is hermetically sealed therein, part of the hermetic seal including fusible material which closes up openings through the container of the anodic reaction zone. The hermetically sealed anodic reaction zone is assembled under normal atmospheric conditions with a suitable cathodic reaction zone and a cation-permeable barrier. When the entire battery is heated to an operational temperature, the fusible material of the hermetically sealed anodic reaction zone is fused, thereby allowing molten sodium to flow from the anodic reaction zone into reactive engagement with the cation-permeable barrier.

8 Claims, 2 Drawing Figures

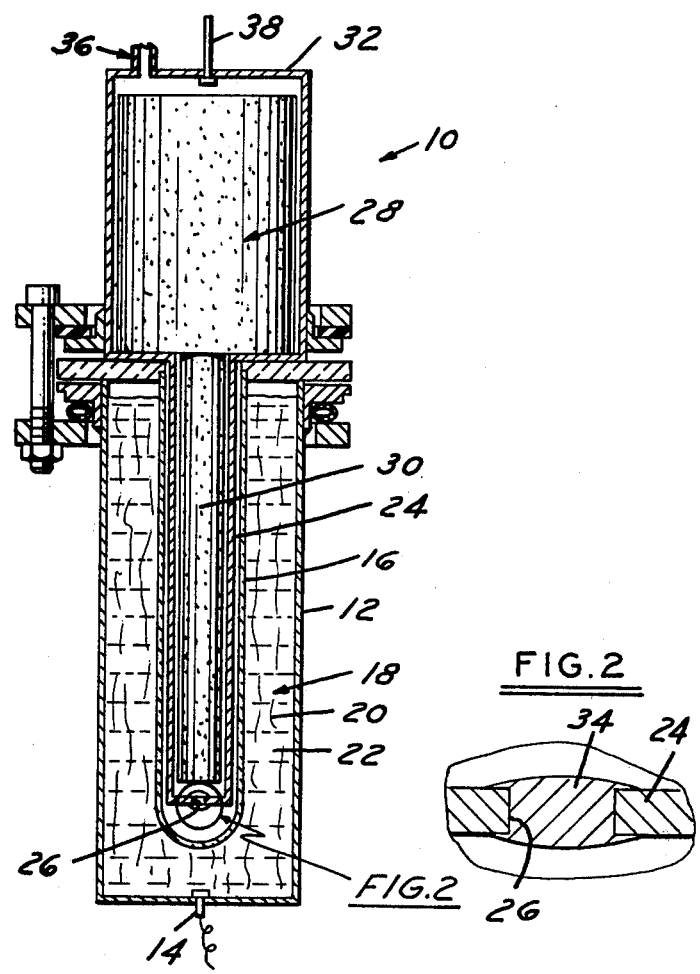

METHOD OF FORMING AND STARTING A SODIUM SULFUR BATTERY

STATEMENT

The invention herein described was made in the course of or under a contract or subcontract with the Department of Energy—DE-AM02-79CH10012.

BACKGROUND OF THE INVENTION AND PRIOR ART STATEMENT

As work continues on the production of a sodium sulfur battery which can be used in commercial applications, many problems are encountered which must be solved in order to make such a battery a cost effective energy system competitive with present day energy systems.

The method taught in this specification is one which provides for a most cost effective assembly of the various components of the battery. By a more cost effective assembly, I mean that the assembly operation does not have to be carried out in its entirety under a protective atmosphere, thereby reducing the cost associated with such assembly as well as the complexity thereof.

The method taught is this specification is also one which provides for an efficient starting of the reactive capability of the battery when assembled. The reactive capability is brought about by heating the assembled battery to an operational temperature. When the method of assembly taught in this specification is employed, the starting capabilities of the battery are greatly enhanced in that the battery normally starts functioning in its intended manner within a few hours after reaching an operational temperature.

It is a principal object of this invention to provide a method of forming a sodium sulfur battery which is more cost effective and a method which provides for a starting of the reactive capability of an assembly battery within a relatively short time after reaching an operational temperature.

U.s. Pat. No. 4,102,042 issued on July 25, 1978 to Steven A. Weiner for a "Method for Preparing a sodium Sulfur Cell" is the prior art I consider most relevant. This patent shows a method of assembling a sodium sulfur cell in which the cathodic reaction zone of the cell is prepared in air. After the preparation of the cathodic reaction zone, that sub-assembly is removed into an inert atmosphere such as argon. After the removal of the assembly into the inert atmosphere, a precast sodium slug is inserted into a safety sleeve of the battery and a cylindrical sodium container portion is placed thereover. The sodium and sulfur containers are then mechanically sealed while the entire cell remains in the inert atmosphere. The cell thus remains in the inert atmosphere during the assembly of the cell components and the sealing thereof. Such assembly techniques are expensive because of the requirement of handling the cell while in an inert atmosphere.

U.S. Pat. No. 4,011,366 issued on Mar. 8, 1977 to Bones et al for "Electric Cell" also discloses technology relating to a sodium sulfur cell. Briefly, this patent shows a circuit breaker device responsive to temperature or current. This circuit breaker device is inserted inside the cell in series in the internal electric circuit of the cell. The purpose of this circuit breaker device is to open the circuit in the cell in the event of either an abnormal cell temperature or current. The circuit breaking device may be in the form of a fusible metal length or a temperature sensitive switch.

SUMMARY OF THE INVENTION

Briefly, in accordance with the teachings of the method of this invention, an anodic reaction zone for a sodium sulfur battery which contains the sodium is formed in a manner in which the sodium contained therein is hermetically sealed. The placement of the sodium in the container and its hermetic sealing take place in an inert atmosphere. Thereafter, in ambient conditions, the anodic reaction zone can be assembled with a cathodic reaction zone in order to form a completed sodium sulfur cell.

In accordance with the teachings of this specification, a method of forming a sodium sulfur battery and of starting the reactive capability of that battery when heated to a temperature suitable for battery operation includes the following general steps.

An anodic reaction zone of a gas impermeable material is formed. This reaction zone is substantially enclosed except for openings extending therethrough in a portion of the anodic reaction zone which serves to meter anodic reactant material to a reaction zone of a completed battery. The anodic reaction zone is filled, in an inert atmosphere, with sodium which will be the anodic material of the battery under battery operating conditions. The openings of the anodic reaction zone are plugged in the inert atmosphere with a gas impermeable material which is fusible, or which dissolves in sodium or reacts with sodium in such a way as to clear a path for the flow of sodium, below the operating temperature of the battery. The openings may be pre-plugged, if desired. In this manner the filled anodic reaction zone is hermetically sealed in the inert atmosphere to form a completed, sealed, anodic reaction zone.

The hermetically sealed, anodic reaction zone is assembled in an ambient atmosphere with a cathodic reaction zone and a cation-permeable barrier. The assembly operation is carried out in a manner so that the cation-permeable barrier lies between the cathodic reaction zone and the portion of the anodic reaction zone having the openings therethrough. After assembly, the battery is heated to a battery operating temperature. During the heating of the battery to this temperature, the fusible material plugging the openings of the anodic reaction zone is fused, the sodium achieves a liquid phase and, once liquified, some of the sodium flows through the openings to a location adjacent the cation-permeable barrier.

After the above actions take place, sodium sulfur battery operating conditions can be established when an electrical connection is made between the anodic reaction zone and the cathodic reaction zone.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is an elevational view, in cross-section, of an assembled sodium sulfur cell; and FIG. 2 is an enlarged, cross-sectional drawing of an area of FIG. 1.

DESCRIPTION OF THE PREFERRED EMBODIMENT

The reader is directed to the teachings contained in the specification of U.S. Pat. No. 4,102,042, mentioned hereinabove, for a full discussion of the theory and operation of a sodium sulfur battery. This patent also contains a complete discussion of the various materials which are used to formulate various compartments of the battery as well as the mode of operation of such a battery.

The basic purpose of this specification is to teach both a method of forming a sodium sulfur battery and a method of starting the reactive capability of that battery when heated to a temperature suitable for battery operation. The method taught in this specification is one in which much of the assembly of the battery components can be carried out in normal ambient conditions, rather than in a condition in which the components are exposed only to an inert gas.

A preferred cell design prepared in accordance with the improved method of this invention is embodied in a sodium sulfur cell generally designated by the numeral 10 in FIG. 1. The cell includes a cylindrical cell container 12 which is formed of any material which is resistant to the polysulfide salts of a cathodic reactant. In the design shown, the container also acts as a current collector and therefore must be a conductor to conduct current to a cathode contact 14. A tubular cation-permeable barrier 16, preferably formed of beta type alumina, is disposed interiorly of the cell container 12. In such a manner, an anodic reaction zone is formed in the interior of the cation-permeable barrier 16 and a cathodic reaction zone is formed between the outer walls of the cation-permeable barrier 16 and the inner walls of the cell container 12. The cathodic reaction zone contains a precast sulfur electrode generally designated by the numeral 18 comprising a porous conductive felt material such as graphite felt 20 and sulfur 22.

Shown with the cation-permeable barrier 16 is a safety sleeve 24. This safety sleeve is formed of a material such as stainless steel which is resistant to molten sodium. As best seen in FIG. 2, the safety sleeve 24 has an opening 26 therethrough such that molten sodium may flow therethrough into the vicinity of the cation-permeable barrier 16. In the cell 10 illustrated in FIGS. 1 and 2, a single opening 26 is provided in the bottom of the safety sleeve 24 for the sake of illustration. However, the opening may be replaced by a plurality of smaller openings adjacent the bottom of the sleeve. Depending on the number of openings provided, the diameters may be anywhere from 0.010 to 0.040 inches.

It should be noted that the safety sleeve 24 is of smaller diameter than the inner diameter of the cation-permeable barrier 16, thus leaving a space for molten sodium to flow around the sleeve and into contact with that barrier.

A sodium metal, generally designated by the numeral 28, is shown disposed within the safety sleeve 24 with an elongated portion 30 thereof extending down into the safety sleeve 24. A sodium container 32 is formed of a material suitably resistant to molten sodium and is disposed above, around and below the sodium metal 28. There are two types of openings in the sodium container 32. One of these is a tubular opening 36 at the top of the container through which liquid sodium may be inserted into the container 32. Second is the one or more openings 26 covered by fusible material through which sodium will flow when the cell is heated to operating temperature.

In accordance with the teachings of the method of this invention, the opening 26 of the safety sleeve 24 is sealed with a fusible material 34, as best seen in FIG. 2. This fusible material may be a material such as a lead solder which will remain solid and hermetic at temperatures just above the melting point of sodium metal but which will melt or dissolve in liquid sodium when the temperature is raised substantially above the melting temperature of liquid sodium. For example, when sodium sulfur cell operation is intended to take place near 660° F., 100% lead solder may be used as the fusible material, as it melts at 622° F. When pure lead is used as the fusible hole covering material, initiation of cell operation may occur at tempertures somewhat below the melting temperature of the lead because the lead can also dissolve in the liquid sodium.

In accordance with the preferred embodiment of the method of forming a sodium sulfur battery, and of starting the reactive capabilities of that battery when heated to a temperature suitable for battery operation, the following steps are carried out.

The sodium container 32 is sealed except for the openings through the tube 36 and the opening 26 of the safety sleeve. The fusible material 34 is then placed in opening 26. Liquid sodium, at a temperature only so high as to assure that it remains liquid during handling, about 250° F., for example, is injected into the sodium container 32 through fill tube 36. The sodium container is then hermetically sealed with an inert atmosphere over the sodium by mechanical closure or welding of the tube 36. In such a manner, an anodic reaction zone of a gas impermeable material is formed. The reaction zone is substantially enclosed except for opening or openings which extend therethrough in a portion of the anodic reaction zone. This opening is (or openings are) designed for metering anodic reactant to a reaction zone of the battery.

In such a manner, also in the inert atmosphere, the anodic reaction zone is filled with sodium which will be the anodic material of the battery under battery operating conditions. Also, the opening is (or openings are) plugged with a gas impermeable material which is fusible below the operating temperature of the battery. In such a manner, the filled anodic reaction zone becomes a hermetically sealed unit.

The hermetically sealed anodic reaction zone is assembled with a cathodic reaction zone, namely, the precast sulfur electrode generally identified by the numeral 18 contained in the cell container 12 and the cation-permeable barrier 16. The assembly is made in a manner so that the cation-permeable barrier 16 lies between the precast sulfur electrode and the portion of the anodic reaction zone, namely, the safety sleeve 24 which has the opening 26 therethrough which is plugged by the fusible material 34.

In accordance with the preferred embodiment of the method of this invention, the assembled components of the battery are heated to a battery operating temperature. During the heating of the battery components, the fusible material 34, plugging the opening 26 of the safety sleeve 24, is fused and/or dissolved. During this same heating, the sodium achieves a liquid phase and some of the liquid sodium flows through the openings from which the fusible material has melted. Sodium flows into a location adjacent the cation-permeable barrier 16 so that the battery operating condition can be established when electrical connection is made between the cathode contact 14 and an anode contact 38 of the battery.

In accordance with the method of this invention, only the anodic reaction zone need be assembled under the conditions of an inert gas. Once the anodic reaction zone is hermetically sealed under inert gas conditions, the rest of the assembly of the battery may take place under ambient conditions where the cost of assembly is rendered less complex and less expensive.

While particular embodiments of the invention have been illustrated and described, it will be obvious to those skilled in the art that various changes and modifications may be made without departing from the invention, and it is intended to cover in the appended claims, all such modifications and equivalents as fall within the true spirit and scope of this invention.

What is claimed is:

1. A method of forming a sodium sulfur battery and of starting the reactive capability of that battery when heated to a temperature suitable for battery operation, which method comprises the steps of:

forming an anodic reaction zone of a gas impermeable material, said reaction zone being substantially enclosed except for opening means extending therethrough in a portion of said anodic reaction zone for metering anodic reactant to a reaction zone of the battery;

plugging said opening means of said anodic reaction zone with a gas impermeable material which is fusible below the operating temperature of the battery;

filling said anodic reaction zone in an inert atmosphere with sodium which will be the anodic material of the battery under battery operating condition;

sealing said anodic reaction zone so that said filled anodic reaction zone is hermetically sealed;

assembling said hermetically sealed anodic reaction zone with a cathodic reaction zone and a cation-permeable barrier in a manner that a sodium sulfur battery is formed in which said cation-permeable barrier lies between said cathodic reaction zone and said portion of said anodic reaction zone having said opening means therethrough; and heating said assembled components of said battery to a battery operating temperature whereby said fusible material plugging said opening means of said anodic reaction zone is fused, said sodium achieves a liquid phase and, at least in part, flows through said opening means to a location adjacent said cation-permeable barrier so that battery operating conditions can be established when an electrical connection is made between said anodic reaction zone and said cathodic reaction zone.

2. The method of claim 1 wherein: said opening means defines a single opening through said anodic reaction zone.

3. The method of claim 2 wherein: said opening means defines a plurality of openings through said anodic reaction zone.

4. The method of claims 1, 2 or 3 wherein: said fusible, gas impermeable material is a lead or a lead-tin solder.

5. A method of forming a sodium sulfur battery and of starting the reaction capability of that battery when heated to a temperature suitable for battery operation, which method comprises the steps of:

forming an anodic reaction zone of a gas impermeable material, said reaction zone being substantially enclosed except for opening means extending therethrough in a portion of said anodic reaction zone for metering anodic reactant to a reaction zone of the battery;

filling said anodic reaction zone in an inert atmosphere with sodium which will be the anodic material of the battery under battery operating condition;

plugging said opening means of said anodic reaction zone in an inert atmosphere with a gas impermeable material which is fusible below the operating temperature of the battery, whereby said filled anodic reaction zone is hermetically sealed;

assembling said hermetically sealed anodic reaction zone with a cathodic reaction zone and a cation-permeable barrier in a manner that a sodium sulfur battery is formed in which said cation-permeable barrier lies between said cathodic reaction zone and said portion of said anodic reaction zone having said opening means therethrough; and heating said assembled components of said battery to a battery operating temperature whereby said fusible material plugging said opening means of said anodic reaction zone is fused, said sodium achieves a liquid phase and, at least in part, flows through said opening means to a location adjacent said cation-permeable barrier so that battery operating conditions can be established when an electrical connection is made between said anodic reaction zone and said cathodic reaction zone.

6. The method of claim 5 wherein: said opening means defines a single opening through said anodic reaction zone.

7. The method of claim 5 wherein: said opening means defines a plurality of openings through said anodic reaction zone.

8. The method of claims 5, 6 or 7 wherein: said fusible, gas impermeable material is a lead-tin solder.

* * * * *